US006318735B1

(12) United States Patent
Lambeth

(10) Patent No.: US 6,318,735 B1
(45) Date of Patent: Nov. 20, 2001

(54) WIPER PIVOT SHAFT AIR INLET GRILL SEAL

(75) Inventor: Micheal Ernest Lambeth, Vassar, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/356,083

(22) Filed: Jul. 16, 1999

(51) Int. Cl.[7] ................................................ F16J 15/52
(52) U.S. Cl. .......................... 277/634; 277/637; 277/644; 15/250.31; 15/250.34
(58) Field of Search ................................ 277/634, 637, 277/644, 650; 296/96.15, 96.17; 15/250.31, 250.34

(56) References Cited

U.S. PATENT DOCUMENTS

| | | |
|---|---|---|
| 2,965,411 * | 12/1960 | Makela . |
| 3,962,744 * | 6/1976 | Bien et al. ......................... 15/250.32 |
| 4,428,533 * | 1/1984 | Pietryk et al. .................... 239/284 R |
| 4,509,878 * | 4/1985 | Bryson et al. ......................... 403/71 |
| 4,893,374 * | 1/1990 | Bienert et al. ..................... 15/250.04 |
| 4,922,570 * | 5/1990 | Hirohama et al. ................. 15/250.02 |
| 5,067,198 * | 11/1991 | Ishikawa et al. .................. 15/250.34 |
| 5,507,585 * | 4/1996 | Diederich et al. .................... 403/349 |
| 5,675,862 * | 10/1997 | Reinl ................................. 15/250.31 |
| 5,771,527 * | 6/1998 | Blachetta et al. ............... 15/250.202 |

* cited by examiner

Primary Examiner—Anthony Knight
Assistant Examiner—Alison K. Pickard
(74) Attorney, Agent, or Firm—J. Gordon Lewis

(57) ABSTRACT

In a windshield wiper drive assembly having a pivot shaft and housing for passage through an aperture formed in a panel of a vehicle, a seal is provided formed as a unitary one-piece cap and seal body. The one-piece body has a cap with a longitudinally extending aperture engageable at one end with the housing and at another end with the pivot shaft. An integrally formed seal portion is provided to be engaged with the panel of the vehicle after installation. The cap has an enlarged portion for snap-fit with respect to the housing, and a reduced portion for sealing engagement with the pivot shaft. The sealed portion extends radially and longitudinally from an inner edge adjacent an outer longitudinal edge of the enlarged portion of the cap toward an outer edge adjacent an outer longitudinal edge of the reduced portion of the cap. The seal portion can extend beyond the outer longitudinal edge of the reduced portion of the cap. The seal portion can taper from a larger wall thickness adjacent to the inner edge to a thinner wall thickness adjacent to the outer edge. The seal portion is composed of an elastomeric material of sufficient rigidity to maintain a conical shape until flattened against the panel of the vehicle during installation.

19 Claims, 2 Drawing Sheets

WIPER PIVOT SHAFT AIR INLET GRILL SEAL

FIELD OF THE INVENTION

The invention relates to a seal for engagement between an air inlet grill and a pivotal shaft of a windshield wiper drive assembly to prevent debris from entering the plenum and HVAC system of the vehicle, and more particularly, to a seal incorporating a decorative cap for the pivot shaft housing.

BACKGROUND OF THE INVENTION

The purpose of a wiper pivot shaft air inlet grill seal is to prevent debris from entering the plenum and the heating, ventilating, and air conditioning (HVAC) system of the vehicle. The seal also prevents excessive water from falling on the windshield wiper motor, and provides a decorative cosmetic cap for the upper pivot housing. Typically, current vehicles are provided with a cosmetic cap for the pivot housing with no seal engaging the air inlet grill. An attempt is made to prevent infiltration of debris by making the aperture in the air inlet grill as small as tolerances will allow around the wiper pivot housing. Generally the aperture is 10 mm to 20 mm larger than the pivot housing diameter. Alternatively, an attempt is made to prevent infiltration of debris by adding a separate foam seal in addition to the decorative beauty cap placed on the pivot housing.

It would be desirable in the present invention to provide a decorative cap including an integral, one-piece, seal for engagement with the air inlet grill in order to prevent debris and fluid from entering the plenum and HVAC system of the vehicle. It should be desirable in the present invention to provide a snap-fit seal engagable with a windshield wiper pivot shaft and an air inlet grill to prevent excessive fluid from falling on the windshield wiper motor.

SUMMARY OF THE INVENTION

The wiper pivot shaft air inlet grill seal according to the present invention is snap-fit with respect to the wiper pivot housing assembly. The seal flange of the present invention closes the gap between the air inlet grill and the wiper pivot housing when the windshield wiper drive assembly is installed in the vehicle. The present invention provides a decorative cap portion integrally formed as a single unit with an outwardly extending seal portion constructed of a material of sufficient rigidity to maintain a generally conical form, and sufficiently soft to lay flat against the air inlet grill panel to seal water against infiltration after installation.

According to the present invention, a seal is provided for a wiper pivot joint and housing mountable through an aperture formed in a panel of a vehicle. The seal includes a one-piece body having a decorative cap with a longitudinally extending aperture engageable at one end with the housing and at another end with the shaft. An integrally formed seal portion of the body is provided to be engaged with the panel of the vehicle after installation. The cap has an enlarged portion for snap-fit with respect to the housing and a reduced portion for sealing engagement with the pivot shaft. The seal portion extends radially and longitudinally from an inner edge adjacent an outer longitudinal edge of the enlarged portion of the cap towards an outer edge adjacent an outer longitudinal edge of the reduced portion of the cap. The seal portion tapers from a larger wall thickness adjacent to the inner edge to a thinner wall thickness adjacent to the outer edge. The seal portion extends generally beyond the outer longitudinal edge of the reduced portion of the cap. The seal portion is composed of an elastomeric material of sufficient rigidity to maintain a conical shape until flattened against the panel of the vehicle during installation. The cap has at least one radially inwardly protruding projection adjacent the outer longitudinal edge of the enlarged portion of the cap for snap-fit engagement with the housing. Preferable, at least four equidistantly spaced projections are provided.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
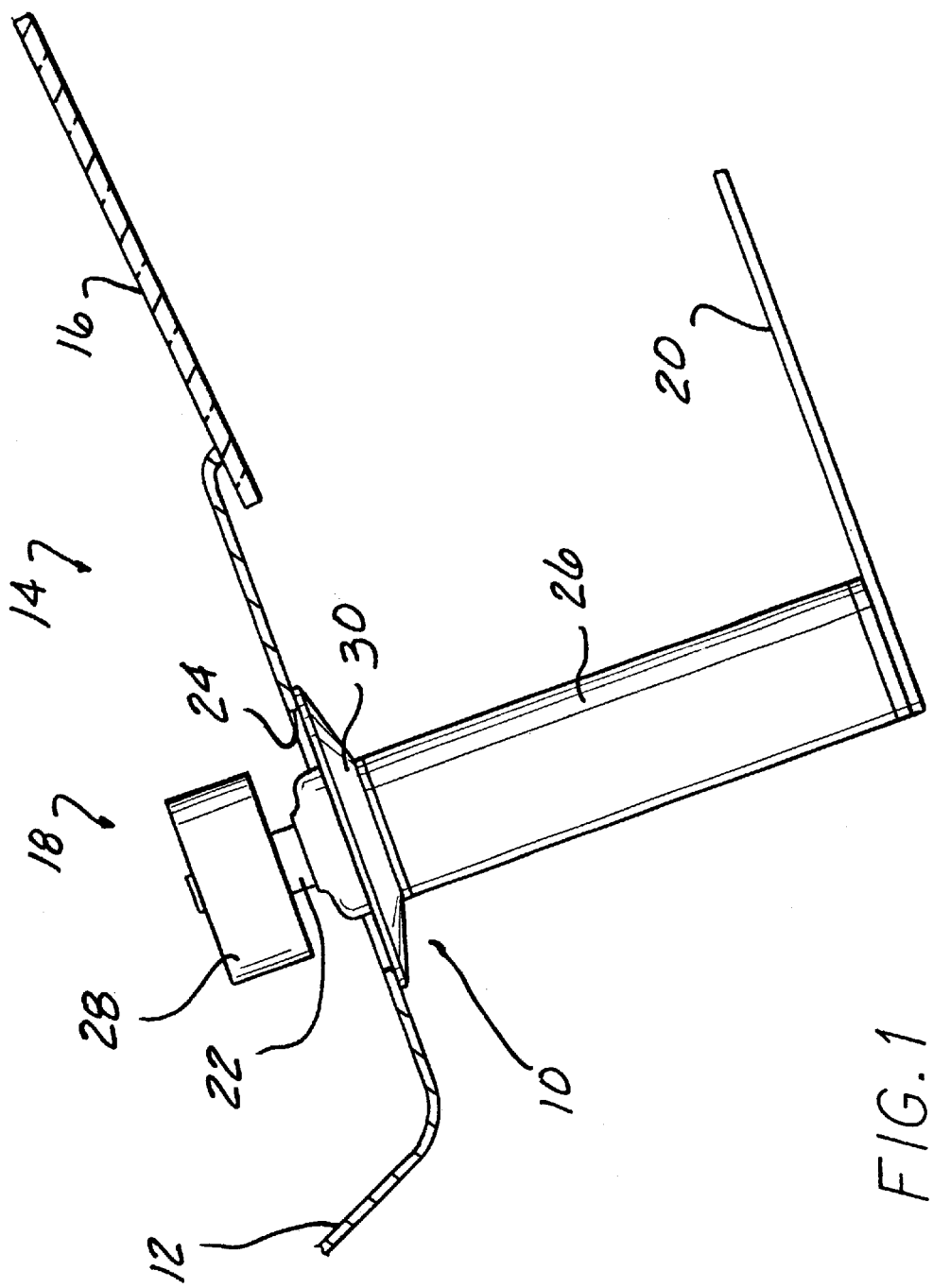
FIG. 1 is a cross sectional view of a vehicle air inlet grill and windshield with an aperture through the grill for receiving a wiper pivot shaft and housing in an installed position according to the present invention.

Referring now to FIG. 1, a seal 10 according to the present invention is illustrated in the installed position with respect to a panel 12, such as an air inlet grill, of a vehicle 14. The vehicle 14 includes a windshield 16. The windshield wiper drive assembly 18 generally includes a drive link 20 for transferring motion from a motor to a pivot shaft 22 passing through the aperture 24 formed in the panel 12 of the vehicle 14. A wiper pivot housing 26 is provided to support the shaft 22, link 20 and wiper arm 28 connected to the shaft 22.

The general structure of the drive link 20, pivot shaft 22, housing 26 and wiper arm 28 is well known to those skilled in the art, and varies to some degree depending on the style of the vehicle to receive the windshield wiper drive assembly 18.

Figure 2:
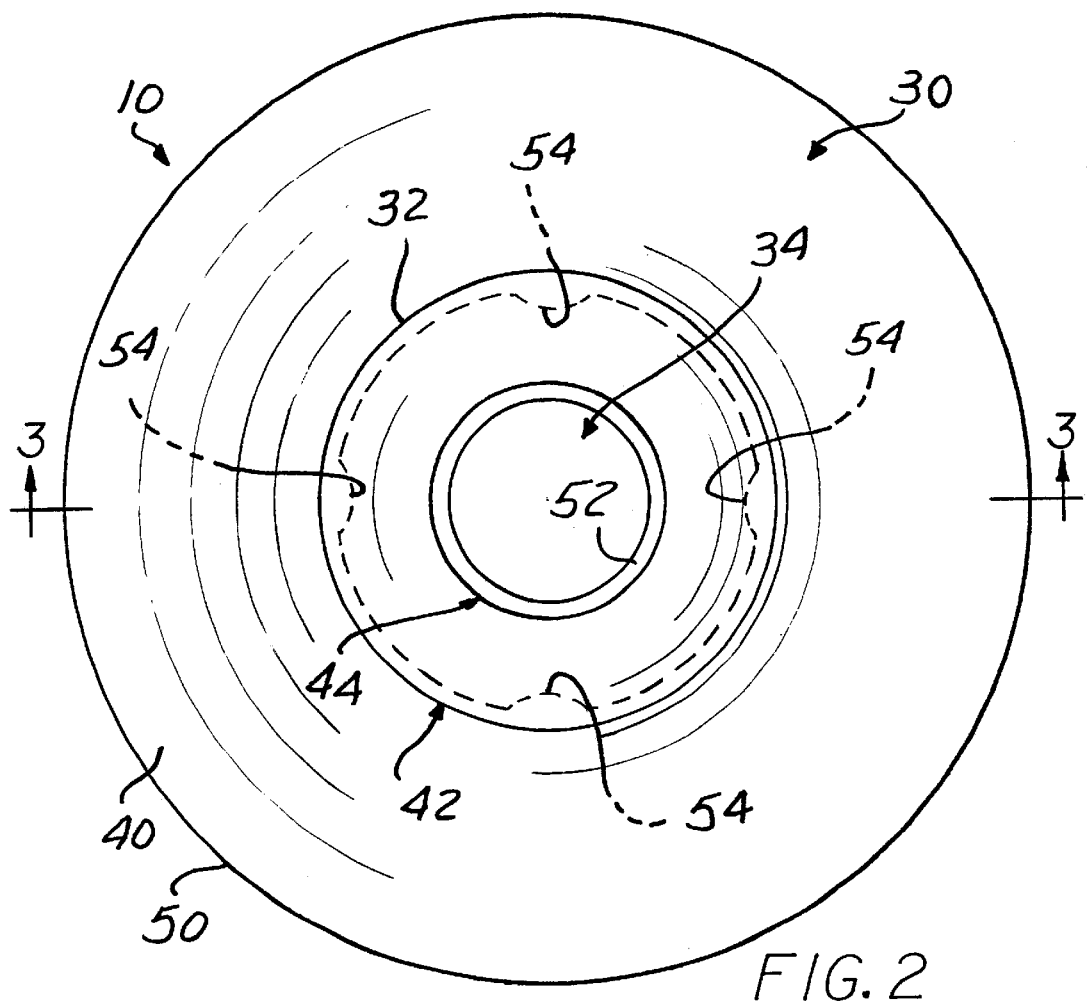
FIG. 2 is a plan view of a one-piece cap and seal body according to the present invention.
Figure 3:
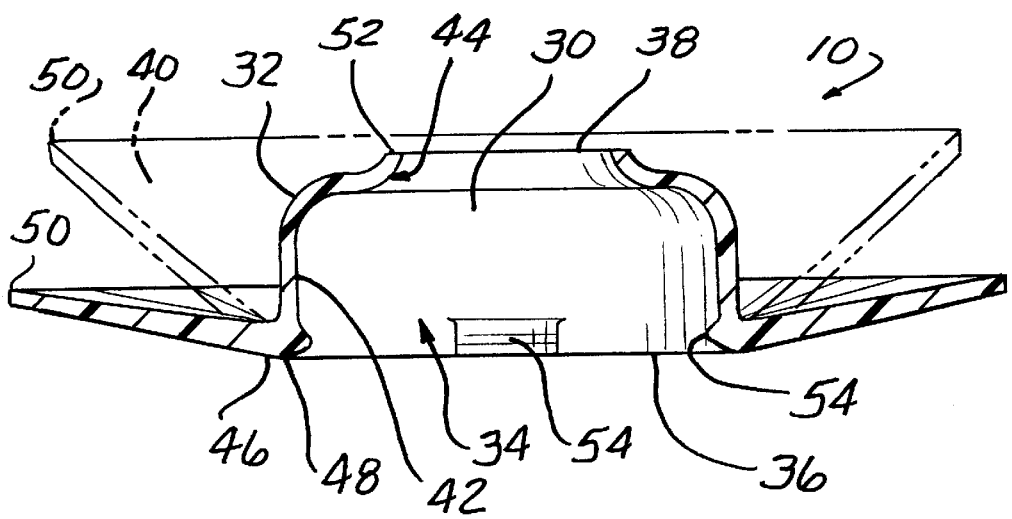
FIG. 3 is a cross sectional view of the one-piece cap and seal body according to the present invention taken as shown in FIG. 2.

The present invention provides the combination of a housing end cap and seal in a single, unitary, one-piece configuration. Referring now to FIGS. 2 and 3, the seal 10 is shown in detail. The seal includes a one-piece body 30 having a decorative cap 32 with a longitudinally extending aperture 34 engagable at one end 36 with the housing 26 (FIG. 1) and at another end 38 with the shaft 22 (FIG. 1). The body 30 also includes an integrally formed seal portion 40 to be engaged with the panel 12 (FIG. 1) of the vehicle 14 (FIG. 1) after installation. The cap 32 has an enlarged portion 42 for snap-fit engagement with respect to the housing 26 (FIG. 1). The cap 32 also includes a reduced portion 44 for sealing engagement with the pivot shaft (FIG. 1).

The seal portion 40 of the one-piece body 30 extends radially and longitudinally from an inner edge 46 adjacent an outer longitudinal edge 48 of the enlarged portion 42 of the cap 32 toward an outer edge 50 adjacent an outer longitudinal edge 52 of the reduced portion 44 of the cap 32. By way of example and not limitation, the preferred embodiment of the present invention includes the seal portion 40 extending longitudinally beyond the outer longitudinal edge 52 of the reduced portion 44 of the cap 32 as best seen in FIG. 3. Preferably, the seal portion 40 tapers from a larger wall thickness adjacent to the inner edge 46 to a thinner wall thickness adjacent to the outer edge 50. The seal portion 40 is preferably composed of an elastomeric material of sufficient rigidity to maintain a conical shape until flattened against the panel 12 (FIG. 1) of the vehicle 14 (FIG. 1) during installation of the windshield wiper drive assembly.

The cap 32 preferably includes at least one radially inwardly protruding projection 54 adjacent the outer longitudinal edge 48 of the enlarged portion 42 of the cap 32 for a snap-fit engagement with the housing 26 (FIG. 1). In the preferred configuration, a plurality of radially inwardly protruding projections 54 are provided spaced angularly at equidistant locations from one another around the periphery of the enlarged portion 44 of the cap 32. By way of example and not limitation, the preferred embodiment illustrated in FIG. 2 illustrates four radially inwardly protruding projections 54 spaced at 90° angular positions with respect to one another around the circumference of the enlarged portion 42 of the cap 32. As best seen in FIG. 3, the configuration of the combination cap and seal of the present invention provides a increased locking force to the snap-fit engagement with the housing 26 (FIG. 1) through the radially inwardly protruding projections 54 when the outer conical seal portion 40 is flattened by engagement with the panel 12 (FIG. 1) of the vehicle 14 (FIG. 1) during installation.

The combined unitary, one-piece, cap and seal of the present invention prevents debris from entering the plenum and HVAC system of the vehicle. The present invention also prevents excessive water from falling on the windshield wiper motor. A cosmetic decorative cap is provided by the present invention for the wiper pivot housing. The wiper pivot shaft air inlet grill seal according to the present invention is snap-fit with respect to the wiper pivot housing assembly and the seal flange of the present invention closes the gap between the air inlet grill and the wiper pivot housing once the air inlet grill panel is installed. A suitable elastomeric material for use in the present invention is commercially available under the trade name SANTO-PRENE™.

The elastomeric material preferably is sufficiently rigid to maintain a conical shape prior to installation, and sufficiently soft to lay flat against the panel to seal against water and debris infiltration after installation.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seal for a wiper pivot shaft and housing mountable through an aperture formed in a panel of a vehicle comprising:

a one-piece body having a decorative cap with a longitudinally extending aperture engagable at one end with the housing and at another end with the shaft, and an integrally formed seal portion engagable with an inwardly facing surface of the panel of the vehicle after installation, wherein the seal portion is composed of an elastomeric material of sufficient rigidity to maintain a conical shape until flattened against the panel of the vehicle during installation.

2. The seal of claim 1 further comprising:

the cap having an enlarged portion for snap-fit with respect to the housing and a reduced portion for direct sealing engagement with the pivot shaft.

3. The seal of claim 2 further comprising:

the seal portion extending radially and longitudinally from an inner edge adjacent an outer longitudinal edge of the enlarged portion of the cap toward an outer edge adjacent an outer longitudinal edge of the reduced portion of the cap.

4. The seal of claim 3 wherein the seal portion extends beyond the outer longitudinal edge of the reduced portion of the cap.

5. The seal of claim 3 wherein the seal portion tapers from a larger wall thickness adjacent to the inner edge to a thinner wall thickness adjacent to the outer edge.

6. The seal of claim 1 further comprising the cap having at least one radially inwardly protruding projection adjacent the outer longitudinal edge of the enlarged portion of the cap for snap-fit engagement with the housing.

7. In a wiper pivot shaft and housing mountable through an aperture formed in a panel of a vehicle, the improvement of a seal comprising:

a one-piece body having a decorative cap with a longitudinally extending aperture engageable at one end with the housing and at another end with the shaft, and an integrally formed seal portion engagable with an inwardly facing surface of the panel of the vehicle after installation.

8. The improvement of claim 7 further comprising: the cap having an enlarged portion for snap-fit with respect to the housing and a reduced portion for direct sealing engagement with the pivot shaft.

9. The improvement of claim 8 further comprising:

the seal portion extending radially and longitudinally from an inner edge adjacent an outer longitudinal edge of the enlarged portion of the cap toward an outer edge adjacent an outer longitudinal edge of the reduced portion of the cap.

10. The improvement of claim 9 wherein the seal portion extends longitudinally beyond the outer longitudinal edge of the reduced portion of the cap relative to the outer longitudinal edge of the enlarged portion.

11. The improvement of claim 9 wherein the seal portion diminishes in wall thickness from a larger wall thickness adjacent to the inner edge to a thinner wall thickness adjacent to the outer edge.

12. The improvement of claim 7 wherein the seal portion is composed of an elastomeric material of sufficient rigidity to maintain a conical shape and flattenable against the panel of the vehicle during installation.

13. The improvement of claim 7 further comprising the cap having a plurality of radially inwardly protruding projections adjacent the outer longitudinal edge of the enlarged portion of the cap for snap-fit engagement with the housing.

14. In a wiper pivot shaft and housing mountable through an aperture formed in a panel of a vehicle in combination with a seal, the seal comprising:

a one-piece body having a decorative cap with a longitudinally extending aperture engageable at one end with the housing and at another end with the shaft, and an integrally formed seal portion engagable with an inwardly facing surface of the panel of the vehicle after installation.

15. The seal of claim 14 further comprising:

the cap having an enlarged portion for snap-fit with respect to a body of the housing and a reduced portion for direct sealing engagement with the pivot shaft.

16. The seal of claim 15 further comprising:

the seal portion extending radially and longitudinally from an inner edge adjacent an outer longitudinal edge of the enlarged portion of the cap toward an outer edge adjacent an outer longitudinal edge of the reduced portion of the cap.

17. The seal of claim 16 wherein the seal portion extends longitudinally beyond the outer longitudinal edge of the reduced portion of the cap.

18. The seal of claim 16 further comprising:

the seal portion tapering from a larger wall thickness adjacent to the inner edge to a thinner wall thickness adjacent to the outer edge, and the seal portion composed of an elastomeric material of sufficient rigidity to maintain a conical shape until flattened against the panel of the vehicle during installation.

19. The seal of claim 14 further comprising the cap having at least one radially inwardly protruding projection adjacent the outer longitudinal edge of the enlarged portion of the cap for snap-fit engagement with the housing.

* * * * *